United States Patent [19]

Yasutake

[11] 4,176,917
[45] Dec. 4, 1979

[54] LIQUID CRYSTAL DISPLAY DEVICE

[75] Inventor: Akira Yasutake, Nagaokakyo, Japan

[73] Assignee: Omron Tateisi Electronics Co., Kyoto, Japan

[21] Appl. No.: 873,095

[22] Filed: Jan. 30, 1978

Related U.S. Application Data

[63] Continuation of Ser. No. 697,429, Jun. 14, 1976, abandoned.

[51] Int. Cl.² .............................................. G02F 1/13
[52] U.S. Cl. .................................. 350/336; 340/378.2
[58] Field of Search .......................... 350/336; 340/336

[56] References Cited

U.S. PATENT DOCUMENTS

| | | | |
|---|---|---|---|
| 3,781,863 | 12/1973 | Fujita | 350/336 X |
| 3,837,729 | 9/1974 | Harsch | 350/336 X |
| 3,877,015 | 4/1975 | Kanazaki et al. | 350/336 X |
| 4,036,550 | 7/1977 | Yih | 350/336 X |

*Primary Examiner*—Edward S. Bauer
*Attorney, Agent, or Firm*—Flehr, Hohbach, Test, Albritton & Herbert

[57] ABSTRACT

A liquid crystal display device having a transparent non-conductive front substrate and a rear non-conductive substrate between which is sandwiched a liquid crystal material. The front substrate includes at least one transparent conductive electrode with leads extending therefrom for connection thereto. The rear substrate includes a cooperating electrode assembly. Activating electrical voltage is applied between a selected front electrode and the rear electrode to create an electric field which activates the liquid crystal material. When the liquid crystal material is activated, it either disperses and changes the transmission characteristics of the liquid or it alters its plane of polarization. In either event the phenomenon is used to provide a display. The electrodes are shaped so that the widths of the rear electrodes are less than the front electrodes and no portion of the leads connected thereto overlap with the display. Thus, there can be electrode misalignment without changing the width of the display, the material under the leads is not activated, and the leads, or portions thereof, are not displayed.

5 Claims, 8 Drawing Figures

LIQUID CRYSTAL DISPLAY DEVICE

This is a continuation, of application serial no. 697,429 filed June 14, 1976 and now abandoned.

BACKGROUND OF THE INVENTION

This invention relates generally to liquid crystal display devices and more particularly to liquid crystal display devices including means for preventing the activation of liquid crystal material under the leads connecting to the elctrodes and for accommodating misalignment of the front and rear substrates.

Liquid crystal devices include a liquid crystal material sandwiched between two substrates. The inner surface of each of the substrates is provided with a patterned conductive coating. When an electric field is applied between the coatings, those portions of the liquid crystal material which lie between those portions of the conductive coatings between which there is applied an electric field change characteristics as by becoming light scatterers or changing their plane of polarization. Where both conductive coatings are transparent, the display is backlighted and the cell selectively transmits light. If the coating on the back side is reflective, ambient light is reflected from the back surface of the display to form the display.

Numerical indicators have been fabricated by employing both scattering and polarizing liquid crystal material. The complete range of numbers 0 through 9 may be displayed by employing a seven segment pattern on the front substrate. Liquid crystal display devices are extensively used in horological, calculator and other instruments.

Generally, the transparent segments are individually connected to sources of potential by transparent leads. This presents a problem since whenever the leads overlap with the conductive coating on the rear electrode, the liquid crystal material between the lead and back electrode is activated and the overlapping portion of the lead is displayed along with the associated segment.

This problem can be overcome by making the pattern on the rear electrode exactly the same configuration and size as the periphery of the front segments. Then, if the substrates are properly aligned, there is no overlap of the leads with the rear substrate conductive pattern. This requires precise alignment during manufacture, making the processing expensive.

Other solutions have been to mask the front electrodes with an opaque conductive coating. However, this gives rise to fringing at the edges of the segments because of the voltage existing between the coating and the underlying rear electrode segments.

OBJECTS AND SUMMARY OF THE INVENTION

It is a general object of the present invention to provide an improved liquid crystal display device.

It is another object of the invention to provide a liquid crystal display device in which the alignment of the front and back substrates is not critical.

It is another object of the present invention to provide a liquid crystal display in which the rear electrode is shaped and sized so that even with misalignment no portion of the rear electrode is opposite the lead portions of the front electrode.

It is another object of the present invention to provide a liquid crystal display in which even with misalignment in any direction, the width of the displayed portions will be kept the same.

The foregoing and other objects of the invention are achieved by a liquid crystal display comprising a transparent front substrate, a rear substrate, a seal disposed between the substrates to form a cell, a liquid crystal material filling the cell, at least one transparent conductive electrode formed on the inner surfaces of one substrate, at least one electrical lead formed on said surfaces and connected to said electrode and providing for connection to an external voltage source, a conductive electrode on the inner surface of the other substrate, an electrical lead formed on said surface and connected to said electrode, said electrode and lead being shaped and positioned so that none of its peripheral portions lie opposite the electrode leads and are substantially within the peripheral portions of the conductive electrodes so that the width of the displayed portions remain substantially constant and the electrode leads are not displayed, even with moderate alignment of the substrates.

DESCRIPTION OF PREFERRED EMBODIMENTS

Figure 1:
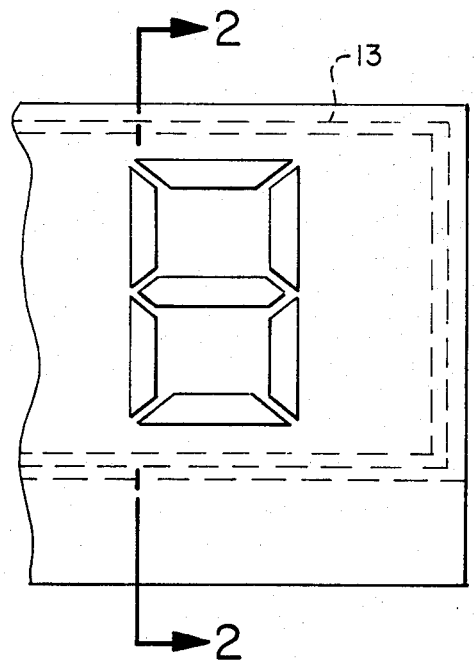
FIG. 1 is a front elevational view of one numeral of a typical liquid crystal display device.
Figure 2:
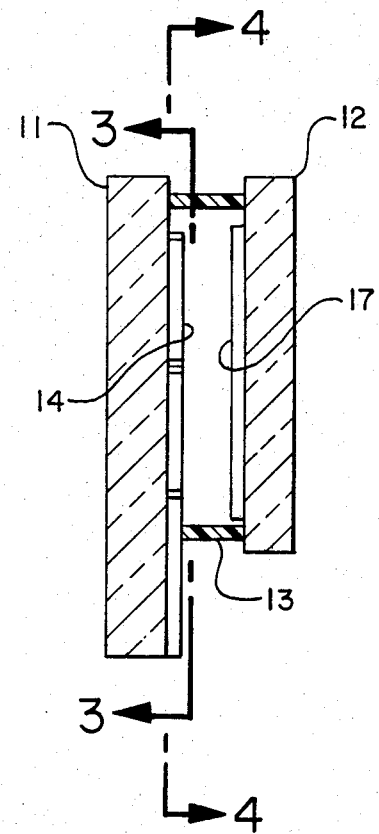
FIG. 2 is a view taken along the line 2—2 of FIG. 1 showing the parallel front and rear substrates, the seal forming the cell, and the liquid crystal material disposed therein.

Referring to FIGS. 1 and 2, there is shown a portion of a liquid crystal display device which includes a front transparent non-conductive substrate 11, such as glass, and a rear non-conductive substrate 12, which may be either opaque or transparent, plastic or glass. When the liquid crystal display device operates in a transmissive mode, the rear substrate is transparent; in the other mode it can be either. A cell is defined between the parallel front and back plates by means of a peripheral seal 13. The cell retains the liquid crystal material which is selected for the particular mode of operation; that is, either for the scattering mode of operation or for the polarizing mode of operation. The seal may be formed of plastic, structural glue, resin material, or any other material which does not react with the liquid crystal material and which maintains a small spacing between the front and rear substrates and forms a seal therewith to define a cell.

Figure 3:
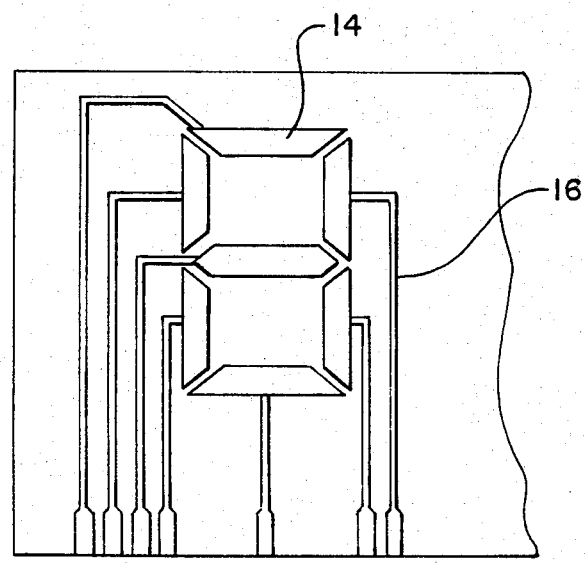
FIG. 3 is a back view of the front substrate showing the patterned transparent electrodes and leads.

On the inner surface of the front substrate there is formed a conductive transparent pattern such as shown in FIG. 3. The pattern shown includes seven segments 14 arranged in the form of a figure "8." It will be apparent that depending upon the desired display there may be one or more electrodes of selected shape and size. The segments are adapted to be individually and selectively energized by application of voltages via cooperating leads 16. The leads 16 are also of transparent conductive material. The conductive transparent pattern may be formed by sputtering tin oxide on the surface or by applying a complete layer of tin oxide and then etching or by other means well known in the art. Transparent conductive electrodes can be formed of other material such as indium oxide. In conventional practice, there is formed a rear conductive electrode 17 which may be made of transmissive material of the same type as described above or may be a reflective coating such as a patterned coating of silver or aluminum. When a voltage is applied between selected electrode segments and the rear electrode, the liquid crystal material therebetween is subjected to an electric field and is activated.

One of the problems with the liquid crystal displays is the fact that if the leads 16 overlap any portion of the back electrode 17, the liquid crystal material which lies between the overlapping portions is subjected to an electric field and, therefore, forms part of the display. This is esthetically distracting. It is preferable to provide means whereby it is assured that the liquid crystal material under the leads 16 is not activated.

Figure 4:
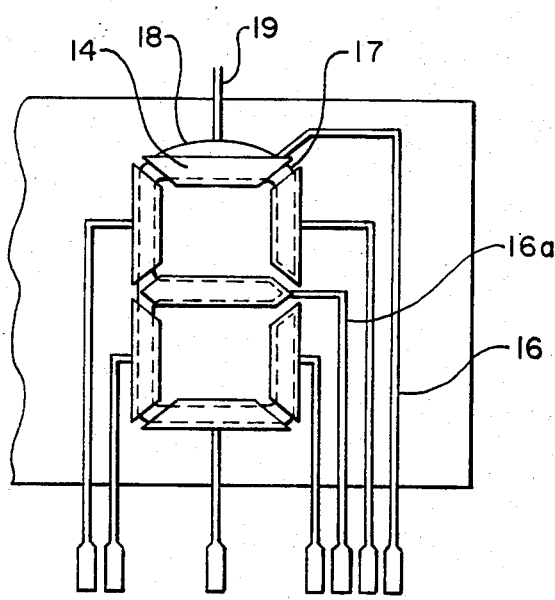
FIG. 4 is a sectional view taken along the line 4—4 of FIG. 2 showing the front electrode conductive pattern and the rear electrode conductive pattern.

Referring more particularly to FIG. 4, there is shown a novel rear electrode 17 which prevents activation of the liquid crystal material behind the leads and which makes the fabrication and location with respect to one another of the substrates during the manufacture less critical. FIG. 4 is taken along the line 4—4 of FIG. 2 and shows the front conductive electrodes 14 with its conductive leads 16. In the embodiment shown, the rear electrode 17 is in the form of a reversed numeral 3 having portions which underlie each of the segments but which have a width less than the segments whereby there is no portion underlying any portion of the leads. The center portion of the reversed "3" does not extend outwardly to cooperate with the lead 16a of the center electrode. A proportion 18 of the rear electrode extends upwardly past the upper front segment and includes a lead 19 for connection to an associated circuit. No portion of this lead lies opposite the front electrodes and, therefore, the overlying liquid crystal material is not activated. It is, therefore, seen that the alignment of the front and back electrodes is not critical since there is room for misalignment both in the vertical and horizontal directions before the electrode 17 has any portion which overlaps any portion of the leads 16. Also, there can be misalignment without changing the width of the display since the rear electrodes control. By suitably selecting the size of the back electrode, any amount of misalignment can be accommodated without displaying the lead portions and without changing the width of the display.

Figure 5:
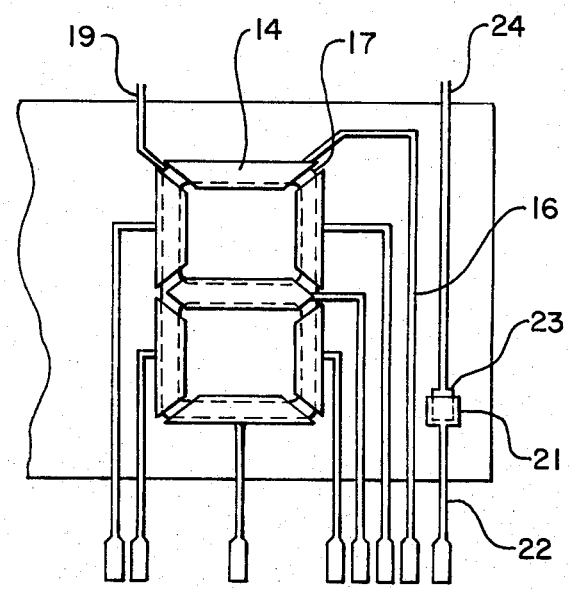
FIG. 5 is a sectional view showing the front electrode and rear electrode conductive pattern of another embodiment of the invention.

FIG. 5 shows another embodiment of the present invention. The front electrodes 14 are the same as previously described. The front electrodes include an electrode 21 to form a dot. Transparent conductive lead 22 is connected with the electrode 21. As shown in FIG. 5, the rear electrode 17 is in the form of a numeral "8" and extends upwardly in the middle upper front segments including a lead 19 for connection to an associated circuit. A rear electrode 23 includes lead 24 for connection to an associated circuit. The electrode 23 has a smaller width than the electrode 21. The interfacing portions define a dot. It is seen that the alignment of the front and back electrodes is not critical since there is room for misalignment in any direction before the electrode 17 or 23 has any portion which overlaps any portion of the lead 16 or 22, respectively.

The pattern of the underlying lead may be selected to be other shapes but in any event the peripheral edges of the pattern opposite the front surface leads 16 should provide enough space whereby positioning is not critical before the back electrode has any portion extending over and overlapping with any of the leads. Thus, the back electrode might be made with most portions larger than the front electrode except for those portions adjacent the leads where it would be notched to assure that any misalignment in the vertical or horizontal directions would not provide portions which overlap adjacent portions of the leads and consequent electric fields in the material underlying the leads.

Figure 6:
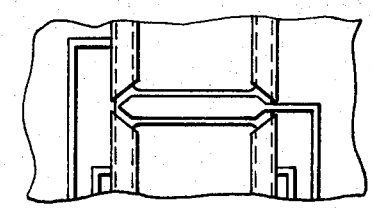
FIG. 6 is a partial view showing another embodiment of the invention.
Figure 7:
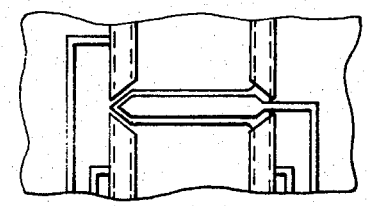
FIG. 7 is a partial view showing still another embodiment of the invention.

As shown in the partial views, FIG. 6 or FIG. 7, the back electrode may be wider than the front electrode in only the middle segment area. The rear electrode in FIG. 6 is in the form of the numeral "8," while the electrode in FIG. 7 is in the form of the numeral 3.

Figure 8:
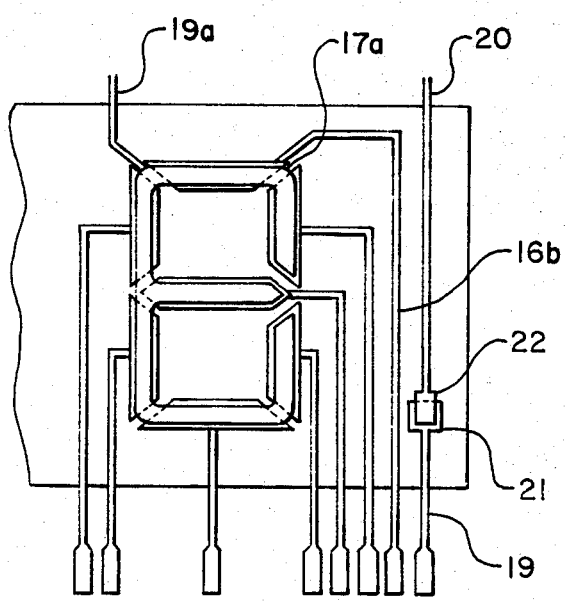
FIG. 8 is a view showing the front and rear electrode conductive pattern of a further embodiment of the invention.

It is apparent to one skilled in the art that the digit electrode and the segment electrodes may be interchanged. That is, what is described as a transparent rear substrate with a transparent electrode and lead can form the front substrate with a digit patterned electrode and lead, and the described transparent front electrode leads and substrate can be the transparent or opaque rear electrode with the transparent or opaque segment patterned electrodes and leads. Operation of the display and the advantages will be the same as those described. An example is shown in FIG. 8 where the reference numeral for the front digit electrode is designated 17a and the leads designated 16b and 19a respectively.

It should be understood that the invention is not limited to the examples described above. The front and rear substrates may have a plurality of digit electrodes and segment electrodes forming a multidigit display. The substrate and electrode geometries may be other than those shown in the figures. The substrates and electrodes may be made of materials other than those named. The electrode patterns may be formed by any one of the well-known means as, for example, by printing, masking or etching, and other techniques well-known in the semiconductor and liquid crystal display art.

What is claimed is:

1. A liquid crystal display device comprising:
 (a) first and second spaced apart transparent substrates:
 (b) a liquid crystal material located between said substrates and being adapted to be activated by an electric field placed between said substrates:
 (c) a plurality of unconnected first transparent conductive electrodes formed on the inner surface of said first substrate to provide an overall pattern, each of said first electrodes defining an elongated outer periphery having opposite side edges and being of fixed width from one of said side edges to its opposite side edges;
 (d) an equal plurality of first electrical leads formed on said inner surface and respectively connected to said electrodes;
 (e) a second conductive electrode formed on the inner surface of said second substrate and being defined by a plurality of connected electrode sections equal in number to said first electrodes, each of said electrode sections defining an elongated outer periphery having opposite side edges and being of fixed width from one of its side edges to its opposite side edge, the width of said sections being less than the width of said first electrodes; and (f) a second electrical lead formed on said inner surface of said second substrate and connected to said second conductive electrode;

(g) said first electrodes and connected first lead and said second electrode and connected second lead being positioned relative to one another such that (i) each of said second electrode sections is aligned with a corresponding one of said first electrodes so that its side edges lie entirely within the side edges of said corresponding first electrode, whereby misalignment perpendicular to the side edges of any given first electrode and an aligned second electrode section may occur between said first and second substrates in an amount at most equal to the difference in width between said aligned electrode and electrode section without changing the width of said given electrode and section actually being displayed, and (ii) said first electrical leads do not have portions which are aligned with said second electrode and said second electrical lead does not have any portion which is aligned with any of said first electrodes whereby, when a voltage is applied between said electrodes, the liquid crystal material therebetween is activated to form a display, said display being adapted to accommodate said misalignment of said first and second substrates before the liquid crystal material opposite any portion of either lead is activated.

2. A liquid crystal display as in claim 1 wherein said first and second substrates are transparent and said first electrodes and second electrodes associated therewith are transparent.

3. A liquid crystal display as in claim 1 wherein said first electrodes are transparent and said second electrode is reflective.

4. A liquid crystal display as in claim 1 wherein said first electrode and said first substrate are transparent and said second substrate and second electrode are transparent.

5. A liquid crystal display device comprising:

(a) first and second spaced apart transparent substrates:

(b) a liquid crystal material located between said substrates and being adapted to be activated by an electric field placed between said substrates:

(c) a plurality of unconnected first transparent conductive electrodes formed on the inner surface of said first substrate to provide an overall pattern, each of said first electrodes defining an elongated outer periphery having opposite side edges and being of fixed width from one of said side edges to its opposite side edge;

(d) an equal plurality of first electrical leads formed on said inner surface and respectively connected to said electrodes;

(e) a second conductive electrode formed on the inner surface of said second substrate and being defined by a plurality of connected electrode sections equal in number to said first electrodes, each of said electrode sections defining an elongated outer periphery having opposite side edges and being of fixed width from one of its side edges to its opposite side edge, the width of all of said sections but one being less than the width of said first electrodes and said one section having a width greater than a particular one of said electrodes; and (f) a second electrical lead formed on said inner surface of said second substrate and connected to said second conductive electrode;

(g) said first electrodes and connected first lead and said second electrode and connected second lead being positioned relative to one another such that (i) each of said second electrode sections except said one section is aligned with a corresponding one of said first electrodes so that its side edges lie entirely within the side edges of said corresponding first electrode, and said one section is aligned with said electrode so that the side edges of the latter lie entirely within the side edges of said one section, whereby misalignment perpendicular to the side edges of any given first electrode and an aligned second electrode section may occur between said first and second substrates in an amount at most equal to the difference in width between said aligned electrode and electrode section without changing the width of said given electrode and section actually being displayed, and (ii) said first electrical leads do not have portions which are aligned with said second electrode and said second electrical lead does not have any portion which is aligned with any of said first electrodes whereby, when a voltage is applied between said electrodes, the liquid crystal material therebetween is activated to form a display, said display being adapted to accommodate said misalignment of said first and second substrates before the liquid crystal material opposite any portion of either lead is activated.

* * * * *